United States Patent [19]

Juy

[11] Patent Number: 4,731,046
[45] Date of Patent: Mar. 15, 1988

[54] CONTROL DEVICE FOR THE PRESELECTION AND INDEXATION OF BACK GEAR CHANGES IN BICYCLES AND SIMILAR VEHICLES

[75] Inventor: Henri Juy, Dijon, France
[73] Assignee: Etablissements le Simplex, France
[21] Appl. No.: 801,875
[22] Filed: Nov. 26, 1985
[30] Foreign Application Priority Data
Nov. 28, 1984 [FR] France .................................. 84 18490
Oct. 28, 1985 [FR] France .................................. 85 16322
[51] Int. Cl.$^4$ .............................................. F16H 11/08
[52] U.S. Cl. ...................................... 474/80; 474/82
[58] Field of Search ................................... 474/80, 82
[56] References Cited

U.S. PATENT DOCUMENTS

| | | | |
|---|---|---|---|
| 2,431,513 | 11/1947 | Schwinn | 474/80 |
| 4,241,617 | 12/1980 | Nagano et al. | 474/82 |
| 4,267,744 | 5/1981 | Yamaski | 474/82 X |
| 4,343,613 | 8/1982 | Leiter et al. | 474/82 |
| 4,384,864 | 5/1983 | Bonnard | 474/80 X |
| 4,504,250 | 3/1985 | Juy | 474/80 |

Primary Examiner—Stephen J. Novosad
Assistant Examiner—Matthew Smith
Attorney, Agent, or Firm—Eric P. Schellin

[57] ABSTRACT

A control device for controlling, preselecting and indexing rear derailleur gear changes on bicycles and similar vehicles. An operating lever is shaped and designed to work together with the control device for adjusting and indexing. The lever may be started from a neutral position to effect a tensioning or slackening of the cable on each reversal of the direction of a pivoting of the lever. The cable can be acted on to move the chair guide transversely for changing or selecting one or more gears, depending on whether or not there is a pedalling action.

15 Claims, 26 Drawing Figures

CONTROL DEVICE FOR THE PRESELECTION AND INDEXATION OF BACK GEAR CHANGES IN BICYCLES AND SIMILAR VEHICLES

The invention concerns a device for controlling, preselecting and indexing rear gear changes on cycles and similar vehicles. The invention relates to the technical side of cycle equipment and accessories, particularly gear changes and their control device.

With regard to gear changes for cycles, one is familiar with systems permitting the preselection of gears either when the cycle is stationary or when pedalling. The various systems offered to date have disadvantages. For example, some systems permit preselection only in one direction—generally when changing up. Others are very complicated, both in terms of their operating principle and the means for using them.

Another significant factor is that, due to their shape, considerable angular movement of the operating lever is necessary, making it difficult, and even impossible to operate without releasing the handlebars, i.e. with a single digit, generally the thumb.

Some devices get round these drawbacks and can be operated by simple pushing movements. However, other drawbacks then arise at the level of the actual control and, more especially, at the level of the transmission with the gear change.

Indeed, handles, levers or other so-called push-type devices are linked to the derailleur by a semi-flexible metal rod of the piano wire type, requiring in addition a protective sheath which must, without fail, be incompressible and non-stretch. In the devices known to date, it is impossible to use a conventional transmission cable, given the actual design of the cable, which is likely to be subjected to stretching and compression during the movement of the control lever, resulting in a considerable lack of control precision.

The aim of this invention is to remedy these drawbacks. As characterised in the claims, the invention solves the problem of creating a control device for a rear derailleur, in which the operating lever is shaped and designed to work together with control, adjusting and indexing devices which, in conjunction with the lever and starting from a neutral position, are capable of ensuring firstly, on the one hand, the tensioning or slackening of the cable on each reversal of the direction of pivoting of the lever and secondly, on the other hand, of acting on the said cable in order to move the chain guide transversely for changing or selecting one or more gears, depending on whether or not there is a pedalling action.

Starting from this basic concept, the invention envisages an initial solution using devices which are designed to be controlled by a lever which can be operated by single pushing movements, and a second solution which uses devices working together with a control lever which can be moved at an angle in one direction or the other.

The advantages obtained with this invention are basically that each time the lever is pivoted in the opposite direction, before actually operating on the gear change, the control cable is tensioned or slackened, ensuring very precise control of the said gear change. The control cable used is of the conventional type, i.e. that commonly employed on cycles, with the cable being located inside a protective sheath, also of known design.

The invention is described below in more detail with the aid of the drawings which show the various designs in accordance with the invention.

FIG. 2 is a perspective view, an alignment view and a view of the sequence of assembling the various component parts of the push-type control mechanism, FIG. 3 is a longitudinal sectional view of the push-type control mechanism, FIG. 4 is a sectional view as seen along line 4.4 in FIG. 3, FIGS. 5 and 6 show on a larger scale the scrap views seen along lines 5.5 and 6.6 respectively in FIG. 3, FIGS. 7, 8, 9, 10 and 11 are schematic views illustrating the operating principle of the push-type control mechanism for, on the one hand, the tensioning or slackening of the cable and, on the other hand, the changing of the gears.

Figures 1, 16:
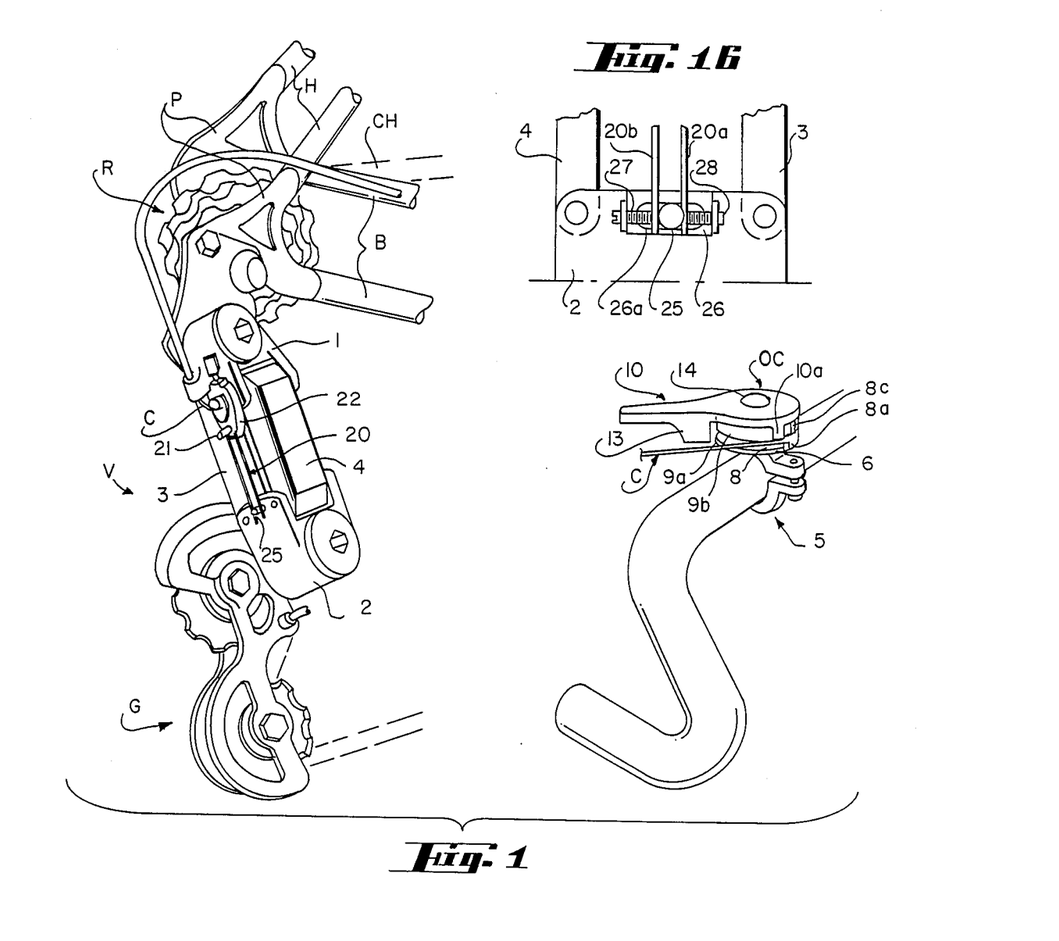
FIG. 1 is a perspective view of the entire device, in accordance with an initial embodiment.
FIG. 16 is a partial front view showing an embodiment for the adjustment of the derailleur.

For better understanding of the rest of the description, FIG. 1 shows the rear section of a bicycle frame, i.e. the rear forks (H) and the bases (B) with the fixing lugs (P) and the hub of the rear wheel equipped with the free wheel (R). A gear change (V) of the deformable parallelogram type is fitted on an elastic articulated mounting, combined with the wheel shaft, by means of a lug, for example.

As generally known, the gear change, as shown in the example, consists mainly of a top supporting clevis (1) and a bottom supporting clevis (2) articulated by means of two links (3) and (4), to form the deformable parallelogram for the transverse movement of the chain (CH) on the free wheel (R).

As generally known, the bottom clevis (2) takes a chain guide (G) connected to an elastic return mechanism, with the said chain guide carrying freely rotating sprockets, for tensioning the chain.

The gear change, particularly by moving the chain guide (G), is connected by a manual control mechanism to a cable (C). Preferably, but not strictly exclusively, the control mechanism is designed to be attached to the handlebars of the bicycle, near the user's hand in the normal pedalling position. The possibility of attaching the control mechanism to the diagonal tube, to the cross bar and even to the bracket has not been excluded.

Figures 2, 3, 4, 5, 6:
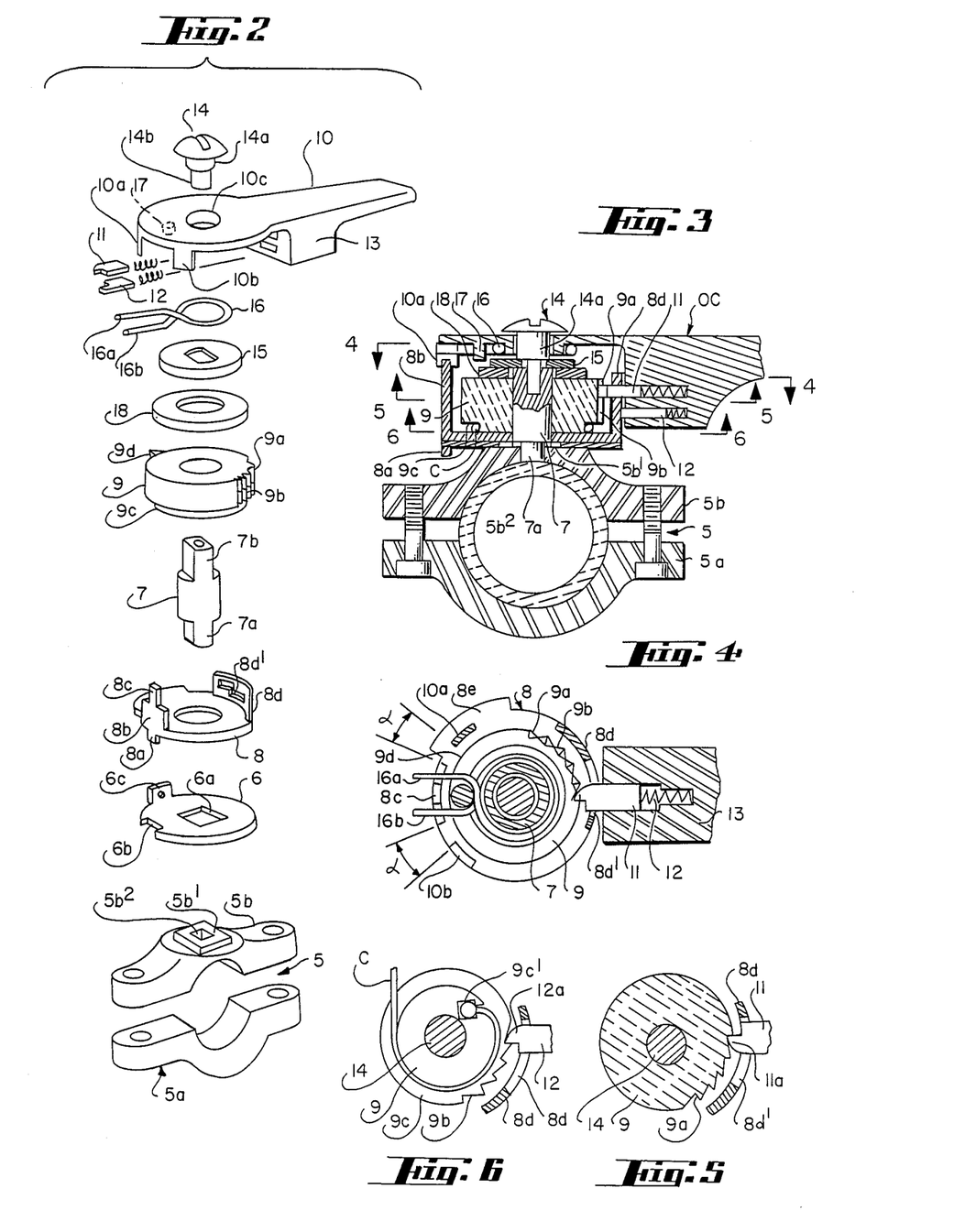

Whatever the place of attachment, the control mechanism consists of the following main components, as seen more especially in FIG. 2 in the drawings.

The control mechanism, designated as a whole by (OC), is attached, for example, by means of a collar in two halves (5a) and (5b). The upper half-collar (5b) has a polygonal contact face (5b1) for the mounting and angular indexing of a quadrant (6) which has an additional opening (6a) for this purpose.

As generally known, the contact face (5b1) has an axial opening with a flat (5b2) for fitting and indexing a corresponding contact face (7a) of a pivot pin (7).

The cylindrical contact face of the pivot pin (7) carries, one on top of the other and rotating freely, a circular indexing and adjusting plate (8) and a drive drum (9) to which is connected the gear change control cable (C). An operating lever (10) which is controlled by the finger is shaped and arranged to work together with the drum (9) and the indexing plate (8), with a view to their being driven jointly or separately in order, on the one hand, to tension or slacken the cable with each reversal of the direction of the lever and, on the other hand, to operate on the gear change, with a view to selecting one or more gears, or else to permit the changing of one or more gears by pedalling.

For this purpose, the circular plate (8) has as an extension of its underside, near its outer edge, a lug (8a) which works, after mounting the plate (8) on the pin (7), together with a notch (6b) formed from the outer edge of the quadrant (6). In line with the lug (8a) and in an axial direction, the plate (8) has as an extension of its upper face a vertical strip (8b) whose free end has a central boss (8c). Diametrically opposite the strip (8b), the plate (8) has a quadrant (8d) with a stepped opening (8d1) projecting vertically from its upper face. As indicated in the following description, this vertical quadrant serves as a cover. The drum (9) is mounted on top of the plate (8) previously described and the whole assembly rotates freely on the cylindrical contact face of the pivot pin (7). The diameter of the drum is determined in such a way that the latter can rotate between the walls of the strip (8b) and of the quadrant (8d) with the necessary operating clearance.

Part of the circumference of the drum (9) has two superposed rows of teeth (9a) and (9b) capable of working respectively with two superposed pawls (11) and (12) mounted in a support (13) forming part of the operating lever (10). After fitting the drum (9), the teeth (9a) and (9b) are positioned opposite the cover (8d), particularly the corresponding sections of the stepped opening (8d1). The pawls (11) and (12) are connected to an elastic mechanism, such as a spring, so as to push the said pawls constantly forward, in the direction of the respective teeth.

Significantly, the two rows of teeth (9a) and (9b) are of opposite pitch to allow the drum to be driven in one direction or the other when the lever (10) is pushed at an angle. The shaped active parts (11a) and (12a) of the pawls are inverted in relation to each other, in conjunction with the corresponding profile of the teeth (9a) and (9b). As generally known, the teeth have one face perpendicular to the generating lines of the drum (9) in order for it to be driven by the corresponding pawl, and one face angled for the disengagement of the said pawl.

The cover (8d) makes it possible to retain the pawls (11) or (12) when they are in contact with its solid surface or to let them pass when they coincide with the stepped opening (8d1) of the said cover. The drum (9) has a circular groove (9c) for winding the control cable (C), the end of which is securely positioned in a shaped location (9c1). As already indicated, it is particularly significant that the cable (C) is of the type commonly used on bicycles, i.e. a series of twisted strands, It is emphasised that the quadrant (6) has a square lug (6c) for the cable (C) to go through and to serve as a support for the protective sheath of the said cable. This operating lever (10) has, at the level of its articulated section, two spaced out lugs (10a) and (10b) which are curved downwards. After mounting the lever (10) on the drum (9) and plate (8), the two lugs (10a) and (10b) are positioned either side of the vertical strip (8b) relative to the plate (8).

For this purpose, the lever (10) is fitted together with a screw (14) which has a smooth, circular contact face (14a) extended at the end by a threaded section (14b) of smaller diameter. The body of the screw (14) is inserted freely into the bore of an internal circular contact face (10c) on the lever (10).

After screwing the threaded section (14b) into the pivot pin (7), the smooth contact face (14a) of the screw (14) rests, via a washer (15), against one or more friction devices (18) resting on the drum (9). The washer (15) is prevented from turning by a contact face with a flat (7b) on the pivot pin (7), with the friction device or devices being washers, for example. One can therefore imagine that, by tightening the screw (14) to a greater or lesser degree, a variable compression force is applied to the drum (9) and plate (8) assembly.

A return spring (16) is suitably wound around the internal contact face (10c) of the lever, with the free ends (16a) and (16b) of the said spring, after being interlaced, being arranged parallel and positioned against each side of the boss (8c) of the strip (8b). A lug (17), which is an extension of the underside of the lever, ensures the relative positioning of the two ends (16a) and (16b).

This spring (16) tends to return the lever (10) constantly to the neutral position, in which position the two curved lugs (10a) and (10b) are equidistant in accordance with a value ($a$) from the edges of the strip (8b) which thus serves as a limit stop. Still in this neutral position, the two rows of teeth (9a) and (9b) on the drum (9) are located opposite the pawls (11) and (12) on the lever.

Significantly, according to this method of assembling the various component parts of the control mechanism, only the drum (9) and the plate (8) are subject to a compression force, with the operating lever (10) rotating freely.

In the neutral position, the angular value ($a$) corresponds to the necessary amplitude applied by the lever to permit the operation of the gear change with a view to the corresponding movement of the chain guide for a gear change. The number of teeth in each of the rows of teeth (9c) and (9b) on the drum is identical and is a function of the number of sprocket wheels on the free wheel. If (n) is the number of sprocket wheels, the number of teeth will be equal to (n−1).

There now follows a description of the operation of the device for controlling the gear change, whatever the method of construction of the latter. The cable (C) is suitably connected to the drum and to the derailleur for moving the chain guide (G). The setting between the lever and the derailleur is assumed to be carried out in such a way that, when the chain guide is aligned with the smallest (or largest) sprocket wheel on the free wheel (R), the active parts of the pawls are positioned opposite one of the ends of the rows of teeth (9a) and (9b) on the drum (9).

Figure 7:
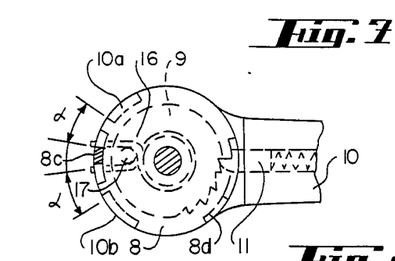
Figure 8:
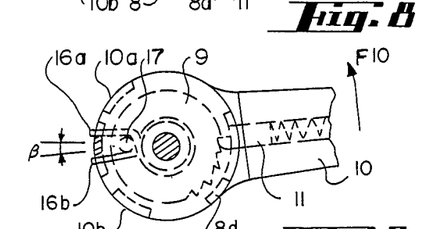
Figure 9:
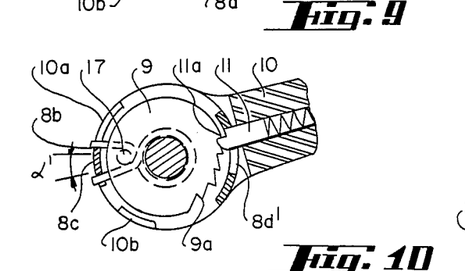

Let us take as an example the instance where the user wishes to change up through the gears: the active parts of the pawls (11) and (12) engage with the corresponding teeth (9a) and (9b) on the drum (9) through the stepped opening (8d1) in the cover (8d). A single push with the finger on the control lever (10) (arrow F10) has the following result:

firstly, the pawl (11) being engaged with a tooth (9a) on the drum (9), the said drum is moved at an angle, simultaneously driving the plate (8) by the frictional force between the drum and the plate set by the screw (14) until the said plate rests, by means of its lug (8a), in the notch (6b) in the quadrant. This limited angular movement ($\beta$) of the plate and drum assembly corresponds, when changing up, to the tensioning of the control cable (FIG. 8), secondly, with the plate (8) still in contact and, therefore, locked at an angle, only the drum is driven by the lever (10) until the curved lug (10a) makes contact with the corresponding vertical edge of the strip (8b). This angular movement causes the corresponding transverse movement of the chain guide (G) for the gear change. In this position, one of the ends (16a) of the spring (16) is against the boss (8c) on the plate (8), while the other end (16b) has a tendency to move away from the said boss (FIG. 9) and is tensioned by the lug (17) on the lever (10).

Figure 10:
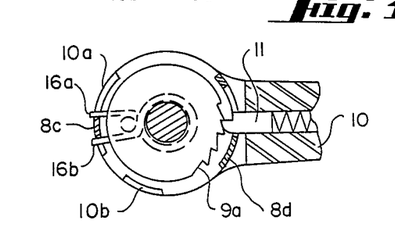

If one releases the finger pressure on the lever, the latter, under the relaxation effect of the spring (16), returns to the neutral position, due to the fact that it is not braked at an angle, with the drum (9) remaining in position due to the disengagement of the pawl on the inclined face of the tooth in question. Similarly, the cover (8d) prevents the other pawl (12) from engaging with the corresponding tooth (9b) on the drum. Since no force is applied to the boss (8c) by the end (16b), this also results in the plate (8) remaining in the stop position in the notch in the quadrant (6), so that the cable therefore remains under tension (FIG. 10).

Figure 11:
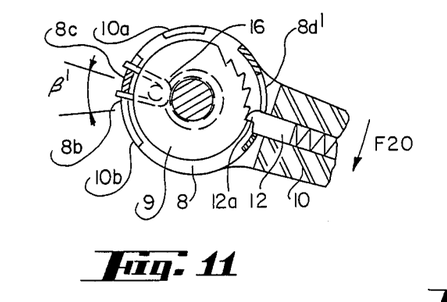

In order to change to the next gear, still moving up, it is simply a question of giving the lever (10) another push, and so on. Conversely, if the user presses the lever (10) with his finger (F20), the chain guide will be moved transversely in the opposite direction to go down through the gears. In the same way as when going up through the gears:

firstly, the angular movement of the lever drives the drum (9) and the plate (8) simultaneously, with the active part of the pawl (12) being engaged in the teeth (9b), until the lug (8a) on the said plate (8) engages in the opening (6b) in the quadrant (6). The limited angular movement ($\beta$1) of the plate (8) and drum (9) assembly corresponds, when changing down, to the slackening of the control cable (FIG. 11), secondly, with the plate (8) still in contact, the drum is driven by the lever until the curved lug (10b) *on the said lever makes contact with the other corresponding vertical edge of the strip (8b)*. As indicated previously, this angular pivoting ($\alpha$) causes the transverse movement of the chain guide (G) for a gear change (down, in this case).

It can be seen, therefore, that with each change in direction of the angular pivoting of the lever, one tensions or slackens the control cable, as the case may be, prior to the actual gear change operation, which is very significant and particularly advantageous for the precision of control of the said gear change.

The control mechanism produced in this way is particularly well suited to the indexing and selection of gears. For example, the plate (8) can have, as an extension of its outer edge and in the same plane, a quadrant (8e) on which are marked digits corresponding to the number of gears to be changed, while the drum (9) can be fitted with an index (9d) located opposite these figures. It is then simply a question of displaying the gear which one wishes to change to by pressing the operating lever (10) a number of times in succession.

It is also possible to display and store the gear number before the actual pedalling action. To this end, the control mechanism described combines advantageously with the gear change shown in FIG. 1, whose operating principle is shown in greater detail in FIGS. 12 to 15. Part of the top supporting clevis (1) takes a torsion spring (20) whose two ends (20a) and (20b) are interlaced starting from a crank pin (21) and run parallel on either side of a stud (25) formed by part of the bottom supporting clevis (2). The face of the crank pin (21) forms an extension of a drum (22) which rotates on a shaft (23) forming a single piece with the clevis (1) and which is controlled by a return spring (24). The drum is located between the two links (3) and (4) of the parallelogram, as well as the stud (25), it being understood that this stud (25) can be arranged on the whole or a moving part of the deformable parallelogram (3–4). The spring (20) is wound, for example, around an extension of the shaft (23) of the drum (22).

Figure 12:
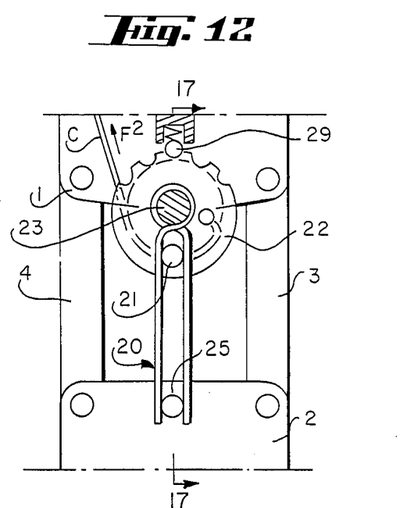
FIGS. 12, 13, 14 and 15 are schematic views showing the operating principle of one type of rear derailleur, designed to be controlled by any of the embodiments of the lever, but more particularly designed to be controlled by the push-type lever.

The control cable (C) wound around the drum (9) of the operating lever is secured firmly to the drum (22), so that a pull exerted on the said cable via the lever rotates the said drum (22).

Figure 13:
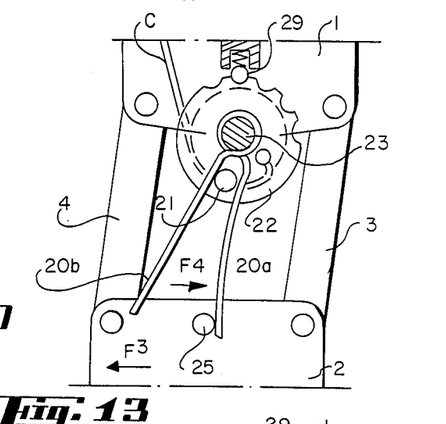

This results in the following operation: let us suppose, for example, that the user wishes to go up through the gears. To this end, he operates the operating lever (10) by pushing it once to change one gear, or more than once to display the gear desired. The cable (C) is thus subjected to a pull (F2) (FIG. 12) which results in the drum being rotated (22). The rotation of the drum (22), by means of its crank pin (21) in conjunction with the ends (20a) and (20b) of the spring (20) working together with the stud (25), especially with end (20a), moves the bottom support (2) of the gear change (arrow F3) and, consequently, the chain guide transversely. The spring (20) is deformed, the end (20a) is subjected to a reaction force (F4) resulting from its position in contact with the stud (FIG. 13). The spring (20) is, therefore, no longer in the equilibrium position as long as no pedalling action takes place. The drum (22) remains in a position corresponding to the gear selected. The chain makes contact for the movement of the bottom support (2).

It is to be noted that the tension of the return spring (24) of the drum (22) is lower than the pull of the cable (C).

Figure 14:
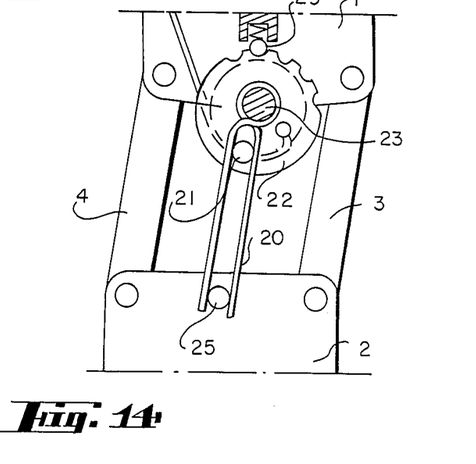

As one pedals and as a result of the movement of the bottom support (2), the spring tends to resume its equilibrium position, so that the two ends (20a) and (20b) are subjected respectively to two forces of equal intensity and in opposite directions (FIG. 14)

Figure 15:
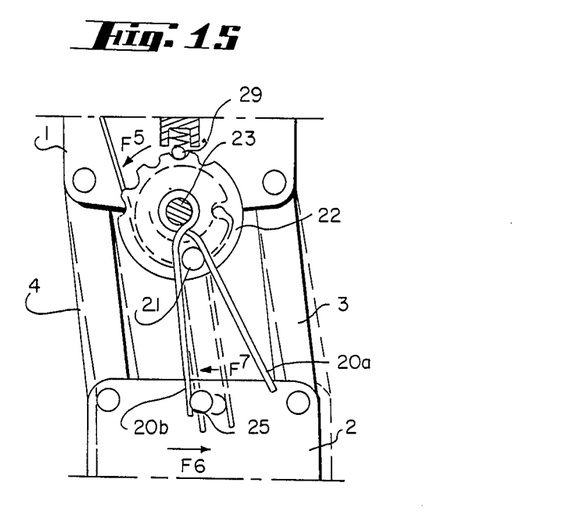
Figure 17:
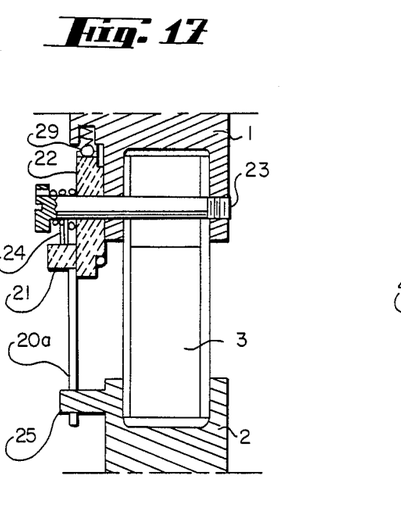
FIG. 17 is a cross-sectional view as seen along line 17.17 in FIG. 12.

For changing down, one moves the operating lever (10) in the opposite direction to the previous one, pushing it once (changing a single gear) or more than once to display the gear desired. The cable (C) is slackened, so that the drum (22), via its previously tensioned return spring (24), rotates in the direction of the arrow (F5). The end (20b) of the spring (20) moves the bottom support (2) transversely in the direction of the arrow (F6) by means of the stud (25), in particular.

If no pedalling is taking place, the spring (20) is deformed and is no longer in its equilibrium position; the stud (25) exerts a reaction force (F7) on the end (20b) (FIG. 15). The drum (22) remains in position in conformity with the gear selected.

As soon as pedalling starts, the reaction force (F7) tends to be cancelled, so that the spring (20) resumes its equilibrium position (FIG. 15) and each of the ends (20a) and (20b) is subjected to a force of equal intensity.

It is necessary to provide a gear change adjustment designed in this way so as to be aligned with the first row of teeth. To this end, the stud (25) is controlled by devices arranged in such a way as to permit the adjustment of its travel in relation to the teeth. For example, the stud (25) is mounted in an oblong hole (26a) formed in a lug (26) which is a direct part of or is attached to the bottom supporting clevis (2). The stud (25) is traversed by a screw (27) whose travel is blocked, while devices (28) make it possible to rotate the screw with a view to moving the stud (25) for adjustment, it being obvious that other adjustment devices can be provided, particularly by varying the angle of the drum (22).

It must be emphasised that, if the two ends (20a) and (20b) of the spring (20) are in contact with both the crank pin (21) and the stud (25) (which are of the same diameter), there is no play in the parallelogram assembly. On the other hand, if the diameter of the crank pin (21) is greater than that of the stud (25), the two ends (20a) and (20b) are in contact only with the said crank pin, thus causing a lateral clearance in the parallelogram assembly, permitting self-centering. If necessary, the circumference of the drum (22) can be partially serrated and work together with a ball (29) connected to a spring in order to "mark" clearly the change or selection of each of the gears in one direction or the other.

It is quite obvious that the derailleur thus described is equipped, as generally known, with adjusting, fixing and protective mechanisms. Therefore, it follows from what has been said that the combination of the main components of the device in accordance with the invention, i.e. the control mechanism (OC) and the rear derailleur, makes it possible to display and store the gear desired by single pushes with the finger and by using a conventional control cable, i.e. one comprising a number of twisted strands. One has therefore designed a selective push-type control by using a cable and sheath of the type commonly used for cycles.

The embodiment illustrated in FIGS. 18 to 26 corresponds to a simplified construction of the device, according to which the control lever for the preselection and indexing of the gears can be operated by the finger in two opposite pivoting directions. On one cylindrical contact face of the pin (7), a shaped quadrant (30) rotates freely; the latter is designed and shaped in such a way as to work in the stop position with corresponding parts of the basic fixed quadrant (6), according to two angular stop positions of the quadrant (30). These two stop positions correspond, as indicated in the description which follows, to the tensioning or slackening of the control cable (C) under the pivoting effect of the operating lever (31). The moving quadrant (30), concentrically with its bore (30a), has, directly or attached to it, a series of sunken and raised sections in the form of teeth (30b) spaced out evenly over a circumference and equidistant from it. The sunken and raised parts of these teeth (30b) mesh respectively with the raised and sunken parts of complementary teeth (31a) formed directly on or attached to the internal face of the lever (31), concentrically with its bore (31b). The sectional shape of the sunken and raised sections of the teeth (30b) and (31a) is determined in such a way that the moving quadrant (30) and the lever (31) can rotate in relation to each other, while permitting indexing when the raised parts of one of the rows of teeth coincided with the sunken parts of the other teeth.

Figures 18, 19, 20, 22:
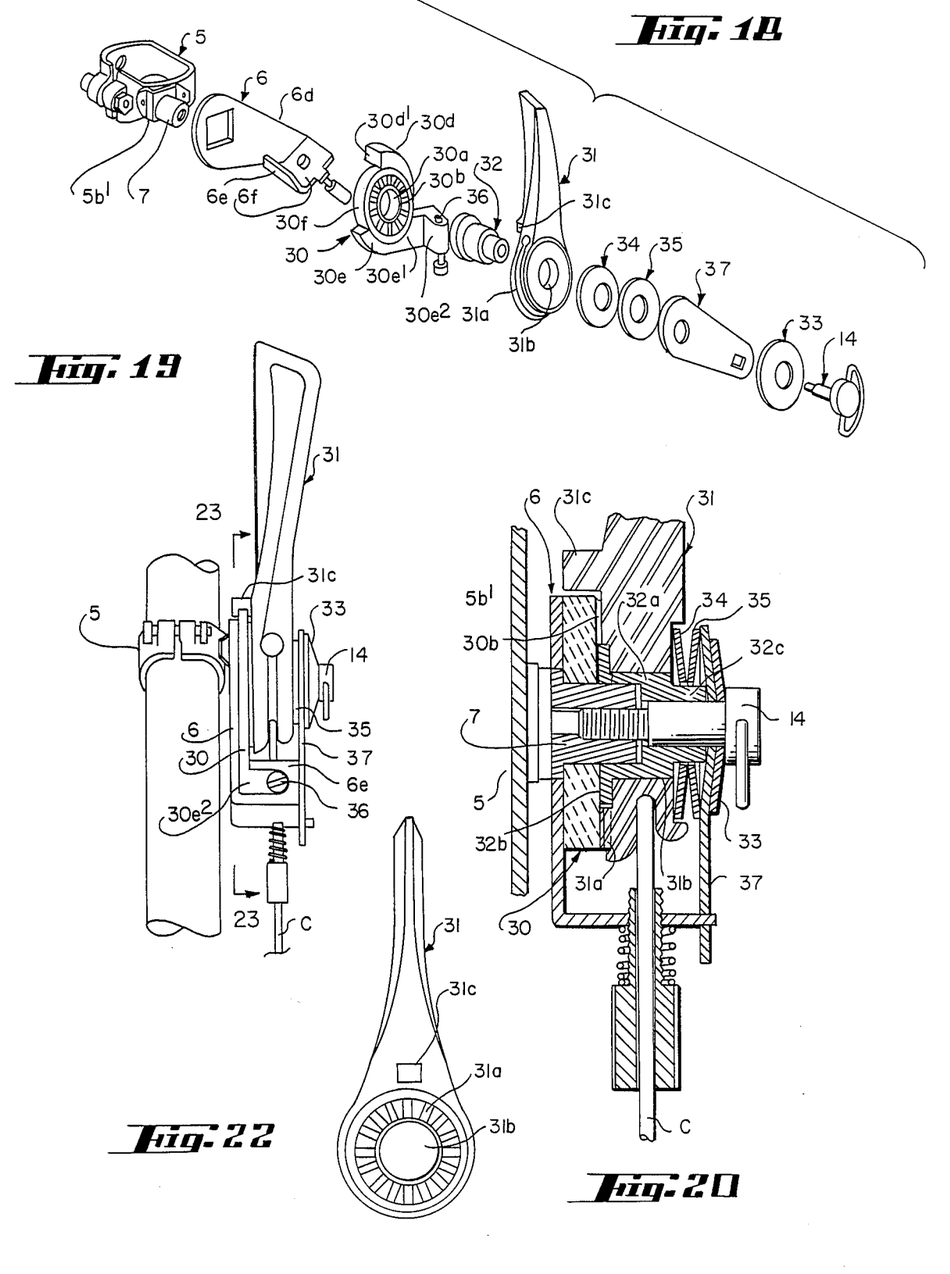
FIG. 18 is a perspective view, an alignment view and a view of the sequence of assembling the various component parts of the selection control mechanism.
FIG. 19 is a side view of the control mechanism assembly mounted on part of the bicycle.
FIG. 20 is a cross-sectional view of the assembly.
FIG. 22 shows the internal face of the lever.

The lever (31) rotates on a cylindrical contact face (32a) of a spacer pin (32) whose base has a circular shoulder (32b) which rests on an annular contact face (30c) of the moving quadrant (30), resulting from the difference in diameter between the bore of the circular row of teeth (30b) and the bore (30a) of the said quadrant. This shouldered cylindrical spacer pin (32) is hollow in order to permit the engagement of the fixing screw (14) in the pivot pin (7). This screw (14) rests via a washer (33) on one or more elastic devices (34) and (35) in the form of elastic washers placed around a contact face (32c) forming an extension of the spacer and making contact with part of the lever (31). The spacer pin (32), after tightening the screw (14), therefore transmits a frictional force in relation to the rotary quadrant (30), so that, under the angular pivoting effect of the lever (31), the said quadrant (30) is driven at an angle at the same time, as far as its contact position with the fixed quadrant (6). A straight washer (37) is fitted in conjunction with the fixing screw (14), being indexed at an angle on a square strip on the fixed quadrant (6). This plate (37) prevents the screw from working loose (14).

Figures 21, 23, 24, 25, 26:
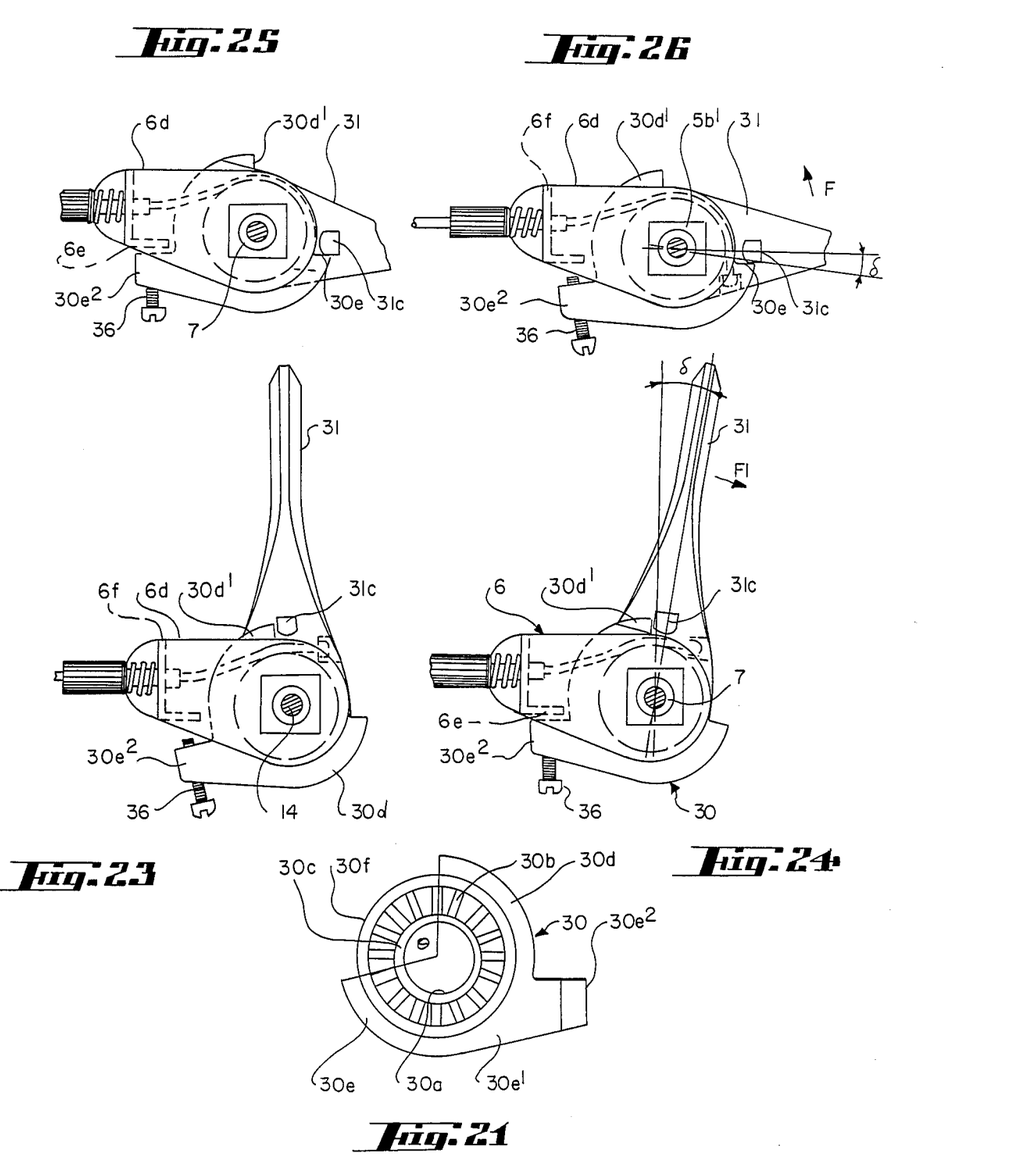
FIG. 21 is a front view of the rotary quadrant.
FIG. 23 is a sectional view as seen along line 23.23 in FIG. 19, in the rest position and before tensioning the cable.
FIG. 24 shows the tensioning of the cable.
FIG. 25 is a view corresponding to FIG. 24, after selecting several gears, with the lever being shown at the limit position.
FIG. 26 is a view corresponding to FIG. 25 showing the slackening of the cable.

The moving quadrant (30) has in the same horizontal plane, as an extension of its circular edge and as an extension of the circular edge of the fixed quadrant (6), two shaped parts (30d) and (30e) which, together, form an opening in the form of the arc of a circle (30f). On both sides of this opening (30f), the corresponding ends of the shaped parts (30d) and (30e) serve as stops at the extreme pivoting positions of the lever, which has for this purpose a lug (31c) which is an extension of its inner face. The angle at the centre ($\theta$), which is defined by the ends of the shaped parts (30d) and (30e), corresponds to the maximum angular deflection of the lever (31), which is a function of the number of gears. The shaped part (30d) of the quadrant (30) has, as an extension of the underside of the quadrant (30), a boss (30d1) which makes contact with a straight edge (6d) on the fixed quadrant (6). The other shaped part (30e) is extended in the form of an arm (30e1) which has at its end, opposite the opening (30f), a square boss (30e2) capable of working together with a square arm (6e) of a vertical strip (6f) of the quadrant (6). The two bosses (30d1) and (30e2) are suitably offset at an angle in terms of height to give limited pivoting latitude ($\delta$) to the lever (31) and quadrant (30) in relation to the fixed quadrant (6), resulting from the contact position of one of the bosses in relation to the corresponding part (6d) or (6e) of the said fixed quadrant (6). Significantly, one of the two stops (30d1) or (30e2) is adjustable in order to limit at will the relative angular movement of the moving quadrant (30) in relation to the fixed quadrant (6). For example, a screw (36) is inserted into the body of the square boss (30e2) in order to work together with the corresponding vertical arm (6e) of the strip (6f) of the quadrant (6).

It is emphasised that the strip (6f) is designed in such a way as to permit the passage of the cable (C) connected to the lever (31) and to serve as a support for the protective sheath of the said cable. It is now appropriate to analyse the operation of the device.

FIG. 23 shows the control lever in the starting position for going up through the gears, with the boss (30d1) making contact with the side (6d) of the fixed quadrant (6). If one moves the lever (31) at an angle in the direction (F1) of the arrow (FIG. 24), the moving quadrant (30) is moved at the same time, taking into account the pressure existing between the two rows of teeth (30b) and (31a) of the quadrant (30) and of the lever (31) and applied via the two elastic friction washers (34) and (35). The quadrant (30) is moved at an angle by a limited amount (δ) until the boss (30e2) makes contact with the straight edge (6e) of the quadrant (6), with this quadrant (30) now being held in this position against the fixed quadrant (6) by the frictional force applied by the screw (14) and transmitted by the spacer pin (32), with the boss (30d1) being disengaged by a corresponding amount. This limited angular movement (δ) corresponds, when going up through the gears, to the tensioning of the control cable (C) and to the compression of the sheath.

If one continues to operate the lever in accordance with the arrow (F1), the said lever is moved in relation to the moving quadrant (30) still in contact with the corresponding part of the fixed quadrant (6), in such a way that the teeth (31a) of the said lever (31) gradually disengage from the points represented by the sunken and raised teeth of the quadrant (30). Each passage of teeth corresponds to the selection or change of a gear. The lever (31) can be operated until its lug (31c) makes contact with the corresponding end of the boss (30e) (FIG. 25).

Conversely, if one applies to the lever (31) a force (F) opposite to the previous one, the moving quadrant (30) is moved by an amount (δ) until the boss (30d1) touches the contact face (6d) of the fixed quadrant (6). In this case, this limited angular movement (δ) corresponds to the slackening of the cable (C) and the relaxation of the sheath, FIG. 26. By continuing to move the lever in this direction, one selects or changes a gear as indicated previously.

Significantly, one sees that the tensioning or slackening of the cable takes place only with each reversal of the direction of pivoting of the lever, so that, as long as one moves the lever in the same direction, the problem of tensioning or slackening of the cable does not arise. Therefore, one obtains precise selection of each gear with each of the successive indexed movements of the lever. The lever can have an index working, for example, with digits marked on an appropriate part of the moving quadrant (30).

As in the previous embodiment, with each reversal of the direction of pivoting of the lever, one effects, before the actual gear change operation, the tensioning or slackening, as appropriate, of the control cable, which is particularly advantageous for the precision of the control of the said gear change. Similarly, this embodiment of the lever also applies to the control of a rear derailleur whose operating principle has been described and illustrated in FIGS. 12 to 17.

I claim:

1. Device for control, preselection and indexing of gear changes for cycles designed to move a chain guide transversely in relation to stepped sprocket wheels forming a single piece with a hub of a rear wheel, with the gear change V being linked via a control cable (C) made of a series of twisted strands to a control mechansim of the level type (31), specially shaped and designed to work with control, adjusting and indexing devices (30b), capable of (1) ensuring the tensioning or slackening of the cable with each reversal of the direction of the lever and, (2) acting on the said cable for the transverse movement of the chain guide for changing or selecting one or more gears, with the control mechanism (31) consisting of a basic quadrant (6) indexed at an angle on a supporting device (5) shaped for mounting the whole assembly on an appropriate part of the cycle, a pivot pin (7) being indexed in conjunction with the quadrant (6) designed for the passage of the cable and to serve as a support for the protective mechanism of the said cable, wherein on one cylindrical contact face of the pivot pin (7), a shaped quadrant (30) rotates freely, having devices to make contact with corresponding parts of the fixed basic quadrant (6) in accordance with two extreme angular positions of the said moving quadrant (30) also has devices working together with other devices on the lever (31) so that; (A) it is driven simultaneously with the lever as far as one of the stop positions corresponding to the tensioning or slackening of the control cable according to the direction of pivoting of the lever and, (B) permits the movement of the lever alone in accordance with preset positions corresponding to a number of gears selected, with the said moving quadrant (30) remaining in the fixed stop position; said gear change is of the deformable parallelogram type, comprising a top supporting clevis (1) and a bottom supporting clevis (2) articulated by means of two links (3) and (4) for the transverse movement of a chain guide on the bottom clevis (2), characterized in that part of the top supporting clevis (1) takes a torsion spring (20) whose two ends (20a) and (20b) are interlaced starting from a crank pin (21) and running parallel either side of a stud (25), on part of the bottom supporting clevis (2), with the said crank pin (21) being in a single piece with a part shaped to be moved at an angle under the pull of cable (C) and returned to position by an elastic mechanism for driving simultaneously, in one direction or the other, the bottom support in conjunction with spring (20); and wherein the lever (31) rotates freely on one cylindrical contact face of a spacer pin (32) which, together with the devices for clamping and fixing lever (31) to pivot pin (7), permits by means of friction, under the effect of the angular movement of the lever and with each reversal of the direction of pivoting of the latter, the simultaneous movement of the moving quadrant as far as one of the two stop positions.

2. Device in accordance with claim 1, characterized in that moving quadrant (30), concentrically with its bore (30a), has a series of sunken and raised profiles in the form of teeth (30b) spaced out regularly over a circumference, while being equidistant with the sunken and raised parts of the teeth (30b) working respectively with the raised and sunken parts of another row of teeth (31a) in the inner face of lever (31) and concentrically with its bore, with the sectional profile of the sunken and raised parts of the said teeth being determined in such a way that the moving quadrant (30) and the lever (31) have relative movement in relation to each other, while permitting indexing when the sunken parts of one of the rows of teeth coincide with the raised parts of the other row of teeth.

3. Device in accordance with claim 1, characterized in that spacer pin (32) has at its base a circular shoulder (32b) which rests on an angular contact face (30c) of moving quadrant (30), resulting from the difference in diameter between the bore of the circular row of teeth (30b) and the bore (30a) of the said quadrant, with the said spacer pin being hollow for the insertion of the fixing screw (14) for the lever (31), with the said screw working together with a washer (33) and a plate (37).

4. Device in accordance with claim 1, characterized in that moving quadrant (30) has in the same horizontal plane, as an extension of its circular edge and as an extension of the circular edge of the fixed quadrant (6), two shaped sections (30d) and (30e) which together form an opening in the form of an arc of a circle (30f) for limited movement of the lever (31) which has a stop lug (31c).

5. Device in accordance with claim 4, characterized in that an angle at the centre ($\theta$) of the opening corresponds to a maximum angular deflection of lever (31) as a function of the number of gears.

6. Device in accordance with claim 4, characterized in that shaped section (30d) of the quadrant (30) has as an extension of the underside of the quadrant (30) a boss (30d1) capable of making contact with a straight edge (6d) of fixed quadrant (6), with the other shaped section (30e) being extended in the form of an arm (30e1) which has at its end, facing the opening (30f), a square boss (30e2) capable working in contact with a square arm (6e) of a vertical strip (6f) of quadrant (6), with the said bosses (30d1) and (30e2) being at an angle to permit limited pivoting latitude ($\delta$) of the quadrant (30) in relation to the fixed quadrant (6).

7. Device in accordance with claim 6, characterized in that one of the two bosses (30d1) or (30e2) is adjustable in order to alter the angle ($\delta$).

8. Device in accordance with claim 1, characterized in that a part of the lever has an index working with references marked on a corresponding part opposite the moving quadrant (30).

9. Device in accordance with claim 8, characterized in that the crank pin (21) is placed face on as an extension of a drum (22) which rotates on a shaft (23) forming a single piece with clevis (1), while being connected to a return spring (24), with a drum and the stud (25) being located between the two links (3) and (4) of the parallelogram, while the spring (20) is wound around an extension of the shaft (23), and the control cable (C), which is wound onto the drum (9) of the operating lever (10), is fastened to the drum (22) of a derailleur.

10. Device in accordance with claim 9, characterized in that, in the neutral position of the operating lever (10) or (31) and after changing one or more gears, the spring (20) is in the equilibrium position, so that the two ends (20a) and (20b) do not apply and are not subjected to any action in respect of the stud (25) whereas, after pushing the lever (10) one or more times for selection when stationary and before pedalling, of one or more gears, the spring (20) is deformed and one of the ends (20a) or (20b) is subjected to a reaction force resulting from its contact with the stud (25), with the said spring (20) returning to its equilibrium position during pedalling.

11. Device in accordance with claim 10, characterised in that the stud (25) is connected to devices shaped to permit the adjustment of its travel in relation to the teeth, so as to align the gear change on the first row of teeth.

12. Device in accordance with claim 11, characterised in that the stud (25) is mounted in an oblong opening (26a) formed in a lug (26) which is a direct part of or is attached to the bottom supporting clevis (2), with the said stud being traversed by a screw (27) whose travel is locked, with devices (28) permitting the rotation of the screw with a view to moving the stud.

13. Device in accordance with claim 11, characterized in that crank pin (21) and stud (25) are of the same diameter, with the two ends (20a) and (20b) of spring (20) being in contact with both the crank pin and the stud, so that there is no play in the parallelogram assembly.

14. Device in accordance with claim 11, characterised in that the diameter of the crank pin (21) is greater than that of the stud (25), with the two ends (20a) and (20b) only making contact with the said crank pin (21) to give lateral play to the parallelogram assembly.

15. Device in accordance with claim 14, characterized in that a plate (8) has a part (8e) for marking digits corresponding to the number of gears, while the drum (9) is equipped with an index (9d) which is located opposite these digits.

* * * * *